(12) United States Patent
Law et al.

(10) Patent No.: US 7,780,126 B2
(45) Date of Patent: Aug. 24, 2010

(54) MODIFIED TRIPOD AND "MULTI-POD" FOR CAMERAS AND OTHER EQUIPMENT

(75) Inventors: David Law, Seattle, WA (US); Ryan Mongan, Sammamish, WA (US); Andrew Grant, Callander (GB); Graeme Esarey, Seattle, WA (US); Martin Aaron Leugers, San Francisco, CA (US); Josh Druker, San Francisco, CA (US); Hao Yu Feng, Mountain View, CA (US); Tark Abed, Palo Alto, CA (US)

(73) Assignee: Daymen Photo Marketing LP, Markham, CA (US)

( * ) Notice: Subject to any disclaimer, the term of this patent is extended or adjusted under 35 U.S.C. 154(b) by 234 days.

(21) Appl. No.: 11/696,740

(22) Filed: Apr. 5, 2007

(65) Prior Publication Data
US 2008/0245945 A1 Oct. 9, 2008

(51) Int. Cl.
*F16M 11/38* (2006.01)
(52) U.S. Cl. ...................................... 248/168; 396/428
(58) Field of Classification Search .............. 248/177.1, 248/439
See application file for complete search history.

(56) References Cited

U.S. PATENT DOCUMENTS 176,692 A * 4/1876 Russell .................... 248/177.1

(Continued)

FOREIGN PATENT DOCUMENTS

JP          03-068277          3/1991

(Continued)

OTHER PUBLICATIONS

International Search Report and Written Opinion, International Appl. No. PCT/US08/77225, mailed Nov. 28, 2008.

(Continued)

*Primary Examiner*—J. Allen Shriver, II
*Assistant Examiner*—Alaeddin Mohseni
(74) *Attorney, Agent, or Firm*—Medler Ferro PLLC

(57) ABSTRACT

As one of the examples, one of the main features is that the setup is small enough that it can live with the camera full-time, and carried around by the user. The legs fold into a very compact size that fit within the footprint of the camera, used for any type camera, e.g. compact point-and-shoot camera, camera phone, or SLR camera. The tripod can then live unnoticed on the bottom of the camera, until a shot requiring a tripod is needed. Then, the legs can be deployed to act as a firm stand. Another one of the main features of this tripod is that all the legs do not share a common end-point or pivot-point. This allows the legs to form a very wide stable platform, even when they are short. In general, for N legs, some legs may have common end-points or pivot-points, but not for all N legs. (N is a positive integer, greater or equal to 3.) This invention can be applied to any camera (e.g. compact camera) and any measurement equipment that uses a conventional tripod or similar setup, such as the ones used by civil engineers or surveyors for the survey of the land and construction measurements or calibrations, or the ones used in optical measurements or laser experiments (e.g. for general level measurements and adjustments). Other variations are also discussed.

18 Claims, 22 Drawing Sheets

U.S. PATENT DOCUMENTS

| | | | | |
|---|---|---|---|---|
| 186,650 | A * | 1/1877 | White | 248/439 |
| 321,781 | A * | 7/1885 | Barrett | 248/439 |
| 514,928 | A * | 2/1894 | Hannahs | 5/178 |
| 519,731 | A * | 5/1894 | Padgitt | 248/439 |
| 543,281 | A * | 7/1895 | Wood | 396/20 |
| 543,373 | A * | 7/1895 | Hoteler | 248/439 |
| 561,857 | A * | 6/1896 | Baxter | 248/439 |
| 873,121 | A * | 12/1907 | Flory | 248/177.1 |
| 2,343,924 | A * | 3/1944 | Petersen | 248/169 |
| 2,589,520 | A * | 3/1952 | Wallenius | 248/177.1 |
| 3,610,224 | A * | 10/1971 | Marshall | 126/19 R |
| 3,614,047 | A * | 10/1971 | Hitze | 248/439 |
| 3,719,362 | A * | 3/1973 | Blanchard | 473/194 |
| 4,003,063 | A | 1/1977 | Takahashi et al. | |
| 4,009,419 | A | 2/1977 | Ligman | |
| 4,155,453 | A | 5/1979 | Ono | |
| 4,458,996 | A | 7/1984 | Harigaya et al. | |
| 4,505,408 | A * | 3/1985 | Sagol | 222/185.1 |
| 4,595,268 | A | 6/1986 | Tsuboi | |
| 4,600,284 | A | 7/1986 | Kondoh et al. | |
| 4,751,540 | A | 6/1988 | Jones | |
| 4,914,521 | A | 4/1990 | Adair | |
| 4,991,325 | A * | 2/1991 | Teduschi | 38/138 |
| 5,070,348 | A | 12/1991 | Hayakawa et al. | |
| 5,130,741 | A | 7/1992 | Nishigaki et al. | |
| 5,337,891 | A | 8/1994 | Toth | |
| 5,455,625 | A | 10/1995 | Englander | |
| 5,510,863 | A | 4/1996 | Kliewer | |
| 5,745,170 | A | 4/1998 | Palmer | |
| 5,791,623 | A | 8/1998 | Louridas | |
| 5,839,461 | A | 11/1998 | Lambeth, Jr. | |
| 5,865,406 | A | 2/1999 | Teeple | |
| 5,926,661 | A | 7/1999 | Maeno | |
| 5,927,681 | A | 7/1999 | Ovelman | |
| 5,938,155 | A | 8/1999 | Garland | |
| 5,943,521 | A | 8/1999 | Lamphron et al. | |
| 5,980,124 | A | 11/1999 | Bernardi | |
| 6,007,259 | A | 12/1999 | Mori et al. | |
| 6,104,882 | A | 8/2000 | Inazuka | |
| 6,209,830 | B1 | 4/2001 | Brotz | |
| 6,254,044 | B1 | 7/2001 | Lee | |
| 6,289,179 | B1 | 9/2001 | You | |
| 6,336,576 | B1 | 1/2002 | Easter | |
| 6,439,518 | B2 | 8/2002 | Brotz et al. | |
| 6,443,407 | B1 | 9/2002 | Ibrahim | |
| 6,637,904 | B2 | 10/2003 | Hernandez | |
| 6,834,162 | B1 | 12/2004 | Schnell | |
| 6,902,294 | B2 | 6/2005 | Wright | |
| 6,920,832 | B2 * | 7/2005 | Lou-Hao | 108/132 |
| 6,991,384 | B1 | 1/2006 | Davis | |
| 7,006,144 | B2 | 2/2006 | Holmberg | |
| 7,057,660 | B2 | 6/2006 | Okuda | |
| 7,178,767 | B2 | 2/2007 | Steyn et al. | |
| 7,182,303 | B2 | 2/2007 | Speggiorin | |
| 2003/0118334 | A1 | 6/2003 | Smith et al. | |
| 2004/0110581 | A1 | 6/2004 | Byrne et al. | |
| 2006/0096874 | A1 | 5/2006 | Doran | |
| 2007/0090235 | A1 | 4/2007 | Ziemkowski | |
| 2007/0115387 | A1 | 5/2007 | Ho | |
| 2008/0245453 | A1 | 10/2008 | Law et al. | |
| 2008/0247746 | A1 | 10/2008 | Law et al. | |
| 2009/0114555 | A1 | 5/2009 | Wu et al. | |

FOREIGN PATENT DOCUMENTS

| | | |
|---|---|---|
| JP | 07-007277 | 1/1995 |
| WO | WO 2009/047649 | 4/2009 |
| WO | WO 2009/056986 | 5/2009 |

OTHER PUBLICATIONS

International Search Report, Int'l Appl No. PCT/IB08/03768 Jul. 2, 2009.

* cited by examiner

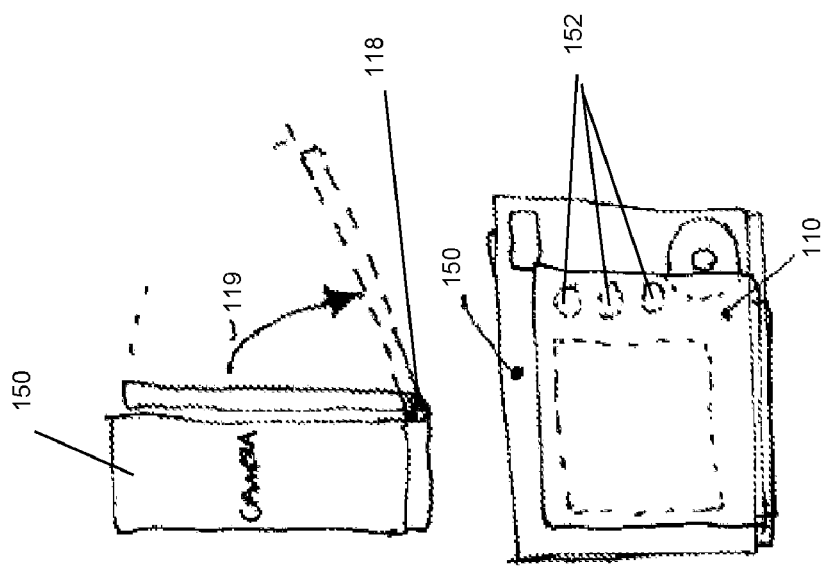
FIG. 6B
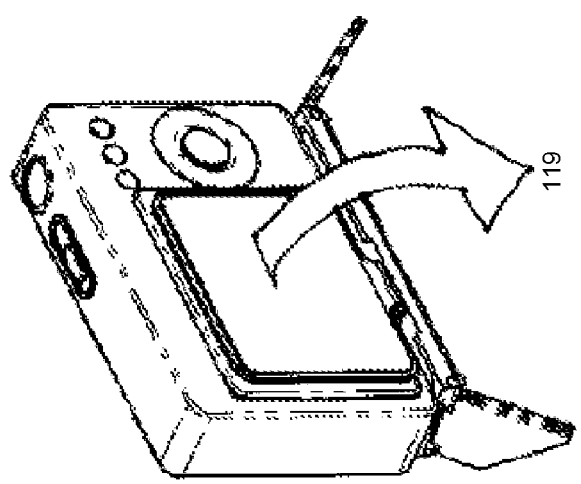
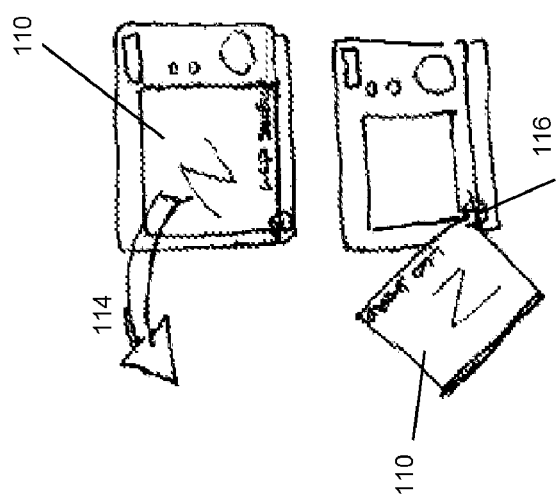
FIG. 6A

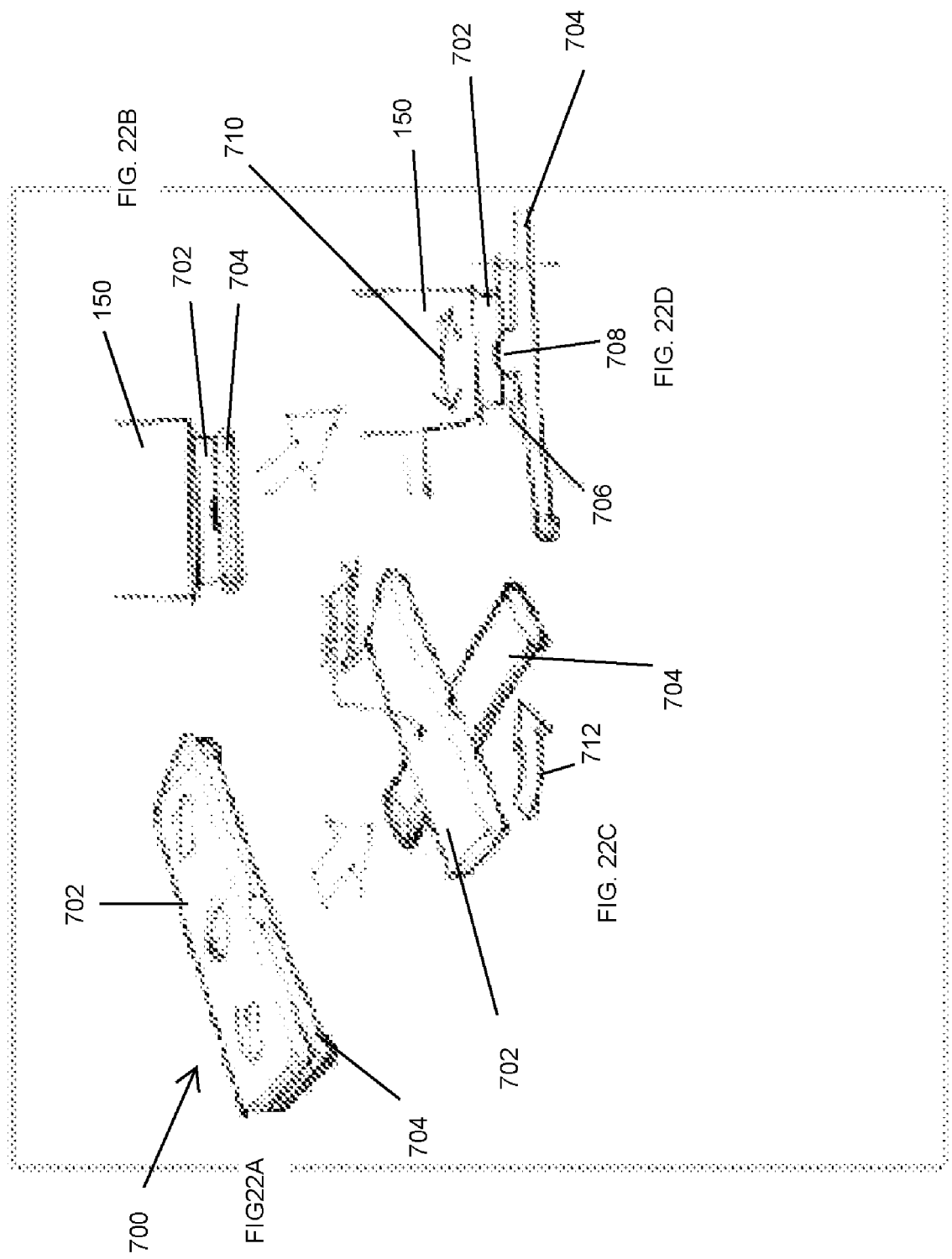

MODIFIED TRIPOD AND "MULTI-POD" FOR CAMERAS AND OTHER EQUIPMENT

BACKGROUND

Tripod and similar multi-legged equipment/setup are used in many applications, for example, in photography, construction, and optical industry/laser measurements. Usually, the tripods are bulky or heavy, and thus, hard to carry around or to store.

Some of the prior art are:
Speggiorin, U.S. Pat. No. 7,182,303, teaches a stabilizer with telescopic rods for tripods.
Steyn, et al., U.S. Pat. No. 7,178,767, teaches a multi-legged equipment support for cameras, spotting telescopes, and the like.

Here, we are presenting new modified designs/structures which improve the prior art.

SUMMARY

As one of the embodiments, one of the main features is that the setup is small enough that it can live with the camera full-time, and carried around by the user. The legs fold into a very compact size that fit within the footprint of the camera, used for any type camera, e.g. compact point-and-shoot camera, camera phone, or SLR camera. The tripod can then live unnoticed on the bottom of the camera, until a shot requiring a tripod is needed. Then, the legs can be deployed to act as a firm stand.

As one of the embodiments, one of the main features of this tripod is that all the legs do not share a common end-point or pivot-point. This allows the legs to form a very wide stable platform, even when they are short. The platform is much more stable than a tripod with similar length legs with all legs pivoting from the same end or location. In general, for N legs, some legs may have common end-points or pivot-points, but not for all N legs. (N is a positive integer, greater or equal to 3.)

The footprint of the tripod is very important for the stability. The condition to have stability is that the vector defining the Earth's pull (gravitational attraction/force, corresponding to the weight), on the object, going through the center of the gravity of the object (or whole system here), should generally be within the triangle defined (on the floor) by the bottom/tip of the 3 legs of the tripod. Otherwise, the whole system falls down on the floor (unstable tripod or system). To avoid the falling caused by vibrations or shaking of the tripod, the vector should stay within that triangle, mentioned above. Thus, it is important to increase the area defined by that triangle (or in general, the area defined by a polygon, for N points or legs, on a flat surface) as much as possible.

The legs in one of the embodiments are flat, except for the hinge area, which allows them to stow into a very compact volume underneath the camera (with a minimal thickness, usually, defining the smallest dimension on the assembly, when folded). When stowed, the legs do not overlap, but rather nest in the bottom of the unit. Although, in another embodiment, they overlap, but they still hide in the bottom of the unit. In one embodiment, the side legs are shown pivoted at an angle to the sides, this allows the ground contact point (at the end of the leg) to be further back from the body, providing more stability.

This invention can be applied to any camera (e.g. compact camera) and any measurement equipment that uses a conventional tripod or similar setup, such as the ones used by civil engineers or surveyors for the survey of the land and construction measurements or calibrations, or the ones used in optical measurements or laser experiments (e.g. for general level measurements and adjustments).

BRIEF DESCRIPTION OF THE DRAWINGS

FIG. 6 shows an LCD/display protection.
FIG. 22 shows the rotating bar design.

DETAILED DESCRIPTION OF THE PREFERRED EMBODIMENT

Angle Adjustment

Figure 1:
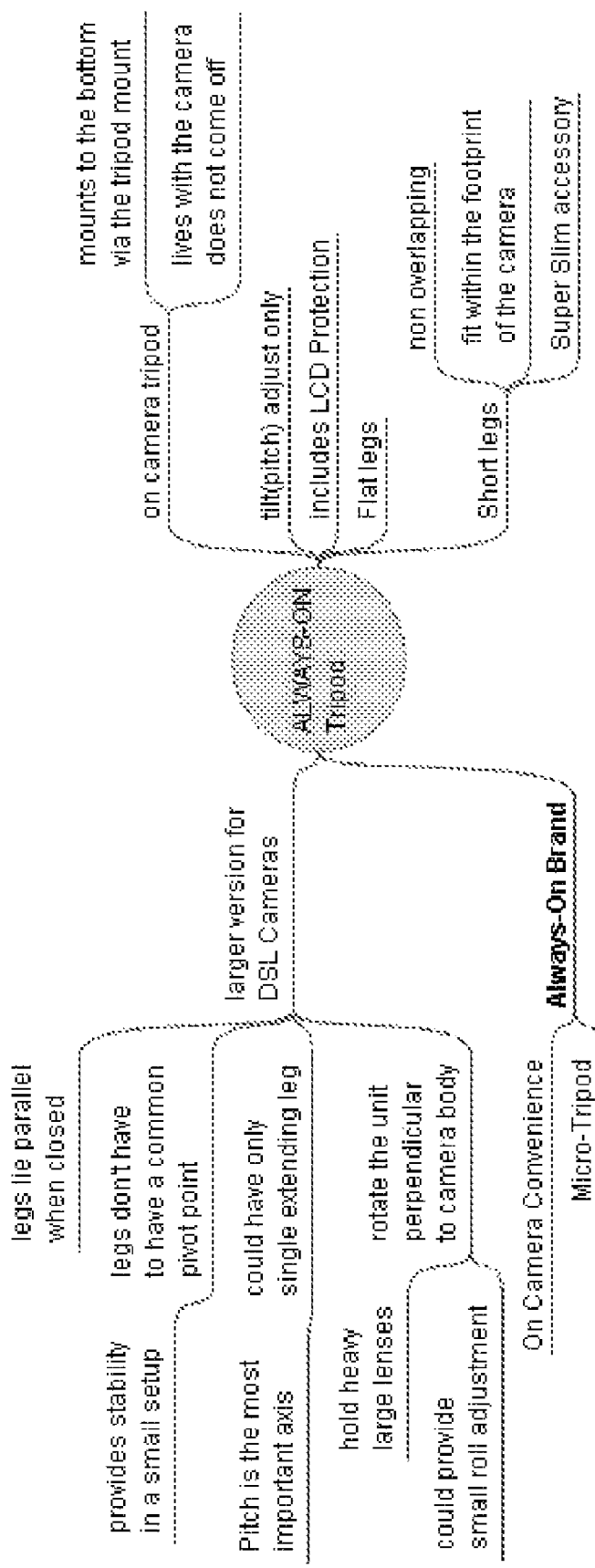
FIG. 1 shows some features of the tripod.
Figure 2:
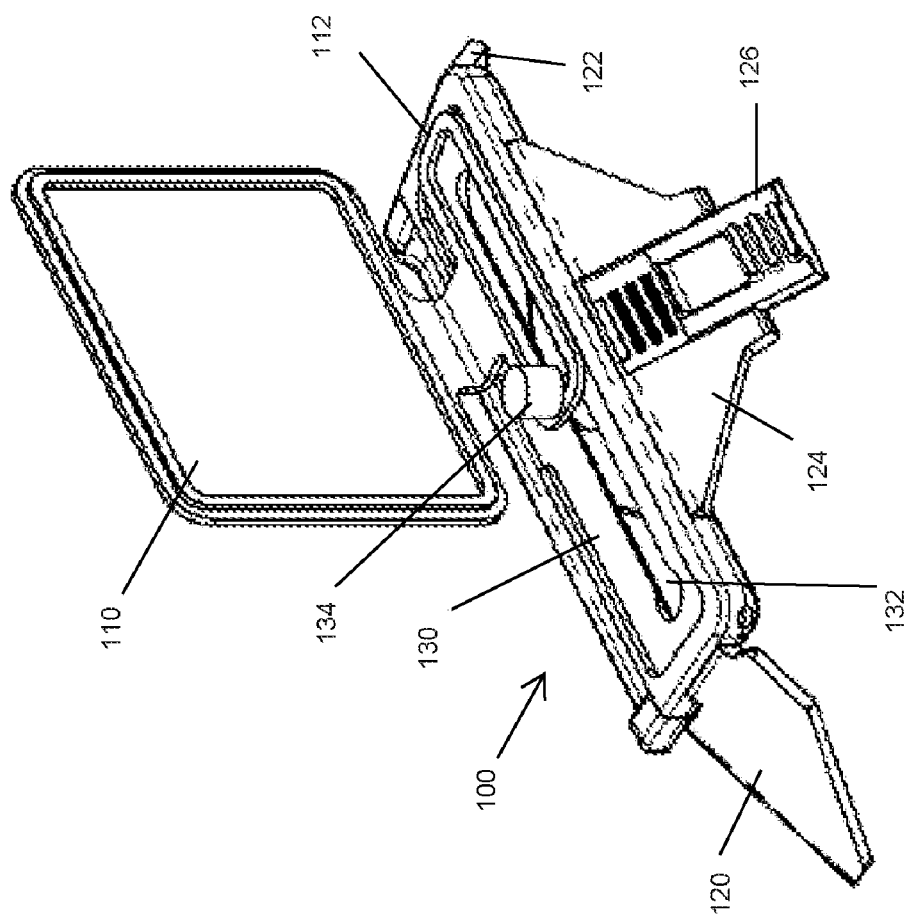
FIG. 2 shows an example of the adjustment mechanism.

There are three axes around which the camera can be adjusted, Pitch, Roll and Yaw. Generally, in the 3-dimensional space, we need 3 orthogonal or independent parameters/axes/coordinates to define and adjust for the position. Yaw can be accommodated simply by positioning of the camera. The two other axes are harder to adjust, and often have complex controls on larger tripods, to perfectly position the camera. In reality, of the axes which require controls on the tripod, the most important axis to adjust is the pitch of the camera. For example, in a portrait shot, if the pitch is incorrect then the subject's head or feet could be cut off. The final axis, the roll axis, is of secondary importance, and given today's digital manipulation, can be easily adjusted as a post-picture process.

Because the micro-tripod is always mounted in the same orientation, relative to the camera, the pitch adjustment can easily be achieved by simply adjusting one leg, the single front, or if positioned at the rear, the rear leg. There are two main ways to adjust the tilt using this leg: one is by adjusting the length of the leg, and the other is by adjusting the angle of the leg. Combining these two on the single leg could potentially provide a larger adjustment range.

One of the embodiments is to adjust the angle by changing the length of the leg. The leg is initially pivoted out from its stored position to its fully-open position, where it rests against a stop. The leg is held in the open position by an over-center spring that also holds it securely in the closed position. The angle adjustment is then achieved by extending a slider on the leg. The slider is held in position by friction, or in discrete positions by detents. The leg length could also be adjusted by rotating a cam member at the end of the leg, or having another pivotal member that changes the length.

The other method of adjusting the pitch of the camera is to adjust the angle at which the leg is rotated to. One embodiment is to use a friction element in the hinge of the leg that is sufficiently strong to prevent the weight of the camera from moving the leg, but weak enough, to allow the user to rotate the leg. Another embodiment includes a detent-type hinge which has multiple positions that the leg would rest in.

LCD Protection

One of the most fragile parts of the camera is the LCD screen. This is getting larger in each consecutive camera release. We are showing an LCD shield that mounts either alone or as a part of the tripod (known as Millipod here), on the bottom of the camera, using the tripod mount hole. The shield wraps around, and can be positioned right against the back of the camera, covering the LCD. The shield is over-sized, compared to the LCD, in order to accommodate multiple camera sizes with one shield. An oversized LCD screen will accommodate all of the LCD sizes of the cameras that it will be mounted to.

Often, however, there are menus and less frequently used controls in close proximity to the LCD. An oversized LCD shield (which accommodates multiple cameras) will potentially cover these buttons. The shield is articulated near the connection point to the base, and allows the user to easily move the shield out of the way, when access to the buttons is required. The articulation in one embodiment is a simple pivoting hinge, however, other embodiments include a slider and a pivot from the corner, in the same plane.

90-Degree Pivoting Tripod (Supports SLR Lenses)

In one embodiment, a tripod is presented that uses legs that stow parallel to each other, along the bottom of the tripod, which is also stored on the bottom of the camera. Two legs are pivoted from one end, and the other leg from the opposite end. The two legs have angled hinge axes, which cause the legs to splay out, to form an inverted V shape. The opposite leg hinges out, too.

On SLR cameras, the tripod mount hole is invariably underneath the center of the lens (in order to support the large lenses). If the tripod has a feature that allows the tripod to pivot 90 degrees around this point, then the tripod is optimally located to be able to support the camera and the lens. Normally, the center of gravity of an SLR camera with even a medium sized lens is toward the forward direction (with respect to the tripod mount hole). The geometry of the tripod, in one embodiment, when pivoted 90 degrees, supports larger lenses than any comparably sized tripod which has all the legs pivoting or mounted from a central/common location.

Either the two legs or the single leg is positioned directly under the lens, significantly further forward of the tripod mount hole. In addition, pitch of the camera can be achieved by again adjusting either the length or the angle of the single leg. The single leg could use a friction hinge to hold the leg in position, or some adjustable stop to limit the rotation of the leg.

In one embodiment, a threaded stop can be turned to adjust the stop point of the leg, and therefore, the pitch of the camera.

Camera Mounted: Always-On Tripod

Figure 11:
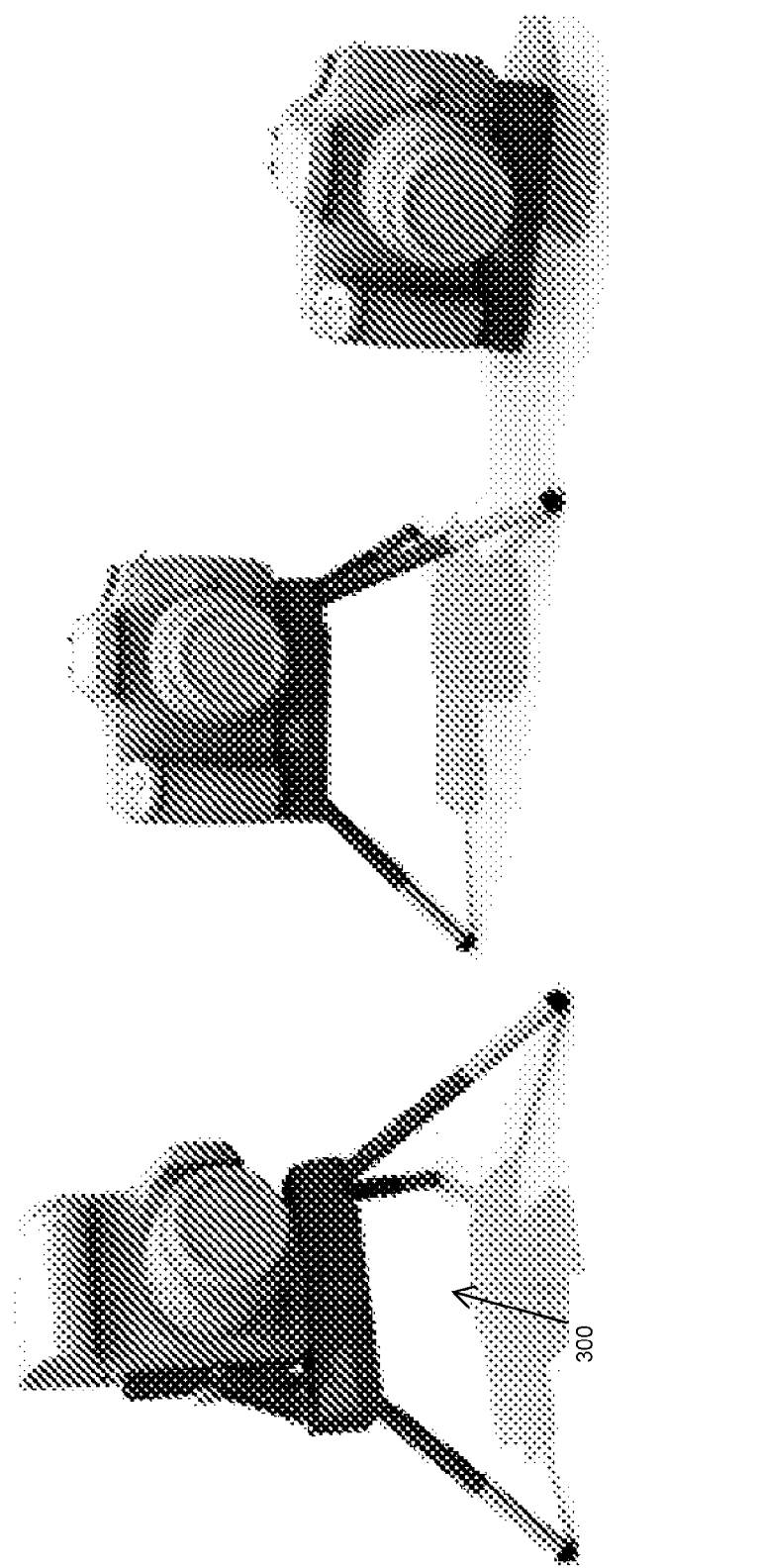
FIG. 11 shows the different orientations for the camera and the folded legs.
Figure 12:
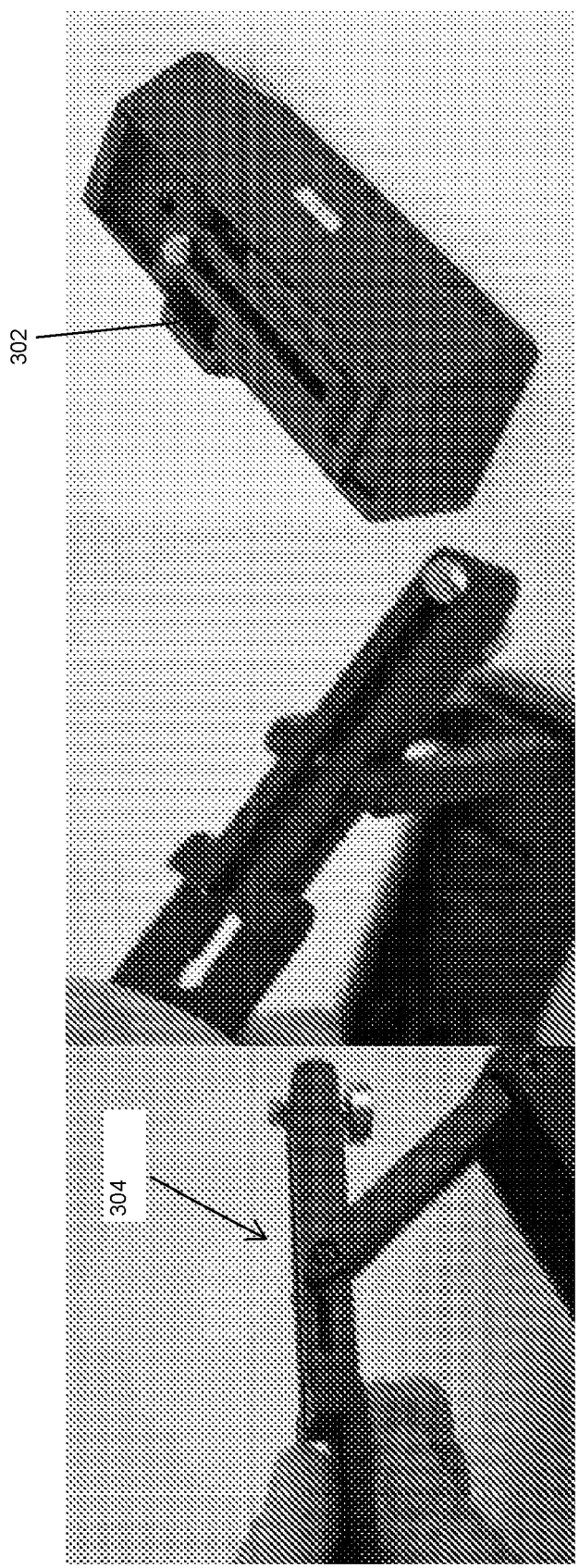
FIG. 12 shows the adjustment setup.
Figure 13:
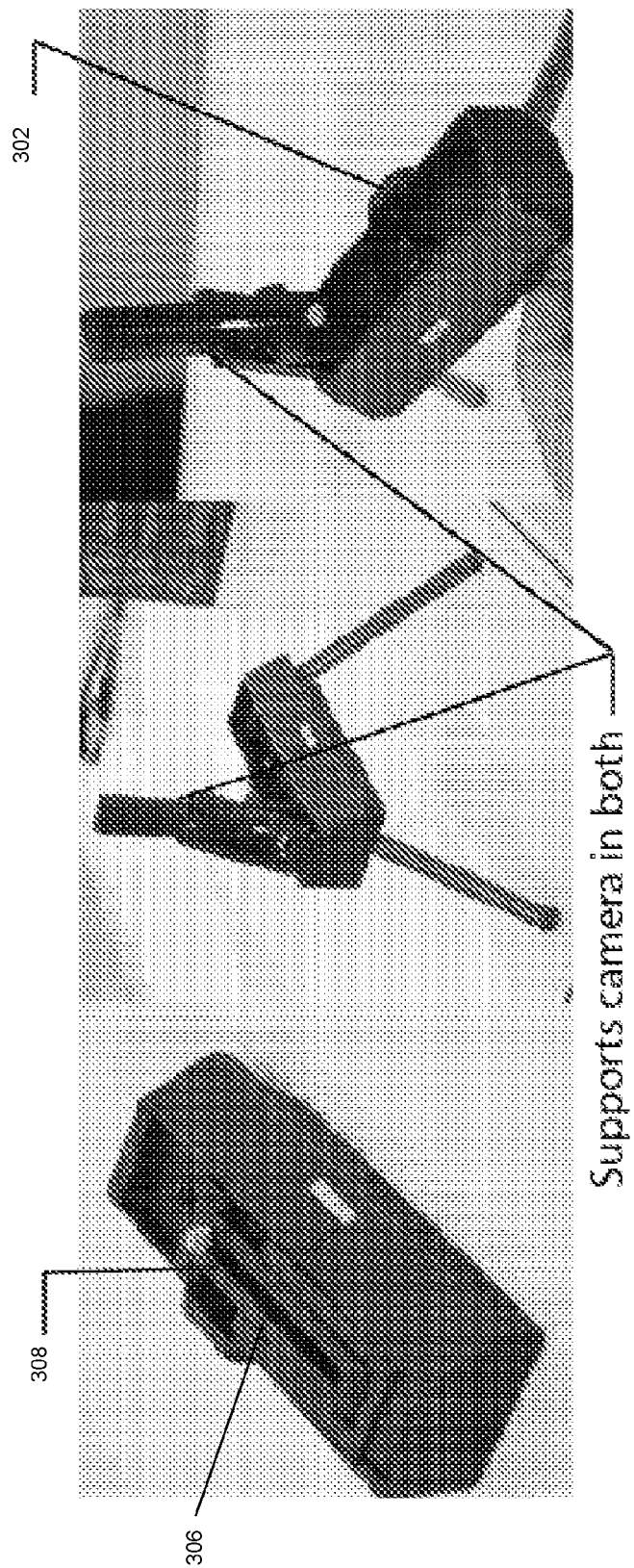
FIG. 13 shows the support setup.

In one embodiment, this allows the camera to be used in both the Portrait and Landscape modes, as shown in FIGS. 11-13. In one embodiment, a camera is positioned in the portrait mode on the tripod 300. A button 302 on the tripod (or pull or a similar item) releases a hinge mechanism 304 to allow the camera to be positioned in the portrait mode. The attachment is loosened between the hinge mechanism 304 and the camera, to allow the camera to slide to the optimum position for the portrait mode, as shown in FIG. 12. The camera is held vertically and sits on the body of the tripod. Once the picture is taken, the user can lift the camera and place it back down on the tripod, where it latches back down and is held tightly. The legs stow parallel along the base of the tripod, and the entire unit can live with the camera. The hinge mechanism includes a base 306 with a slot 308 to accommodate different cameras. In one embodiment, the legs are telescoping and stay in place, using friction, which lets the user to adjust various angles, to get the prefect picture. (We call this setup Millipod or Micro-Tripod.)

Figure 3:
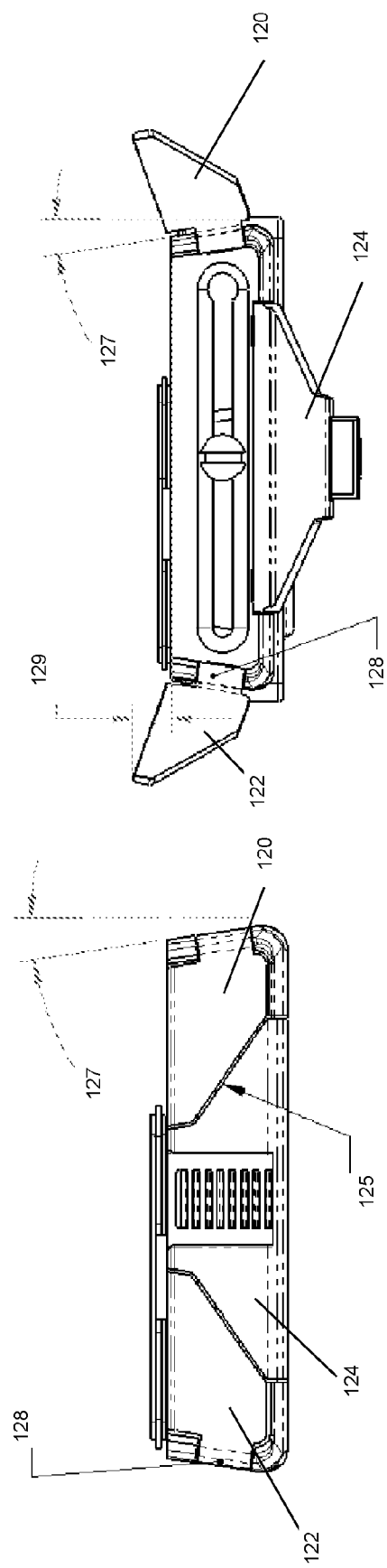
FIG. 3 shows an example of the folded legs.
Figure 4:
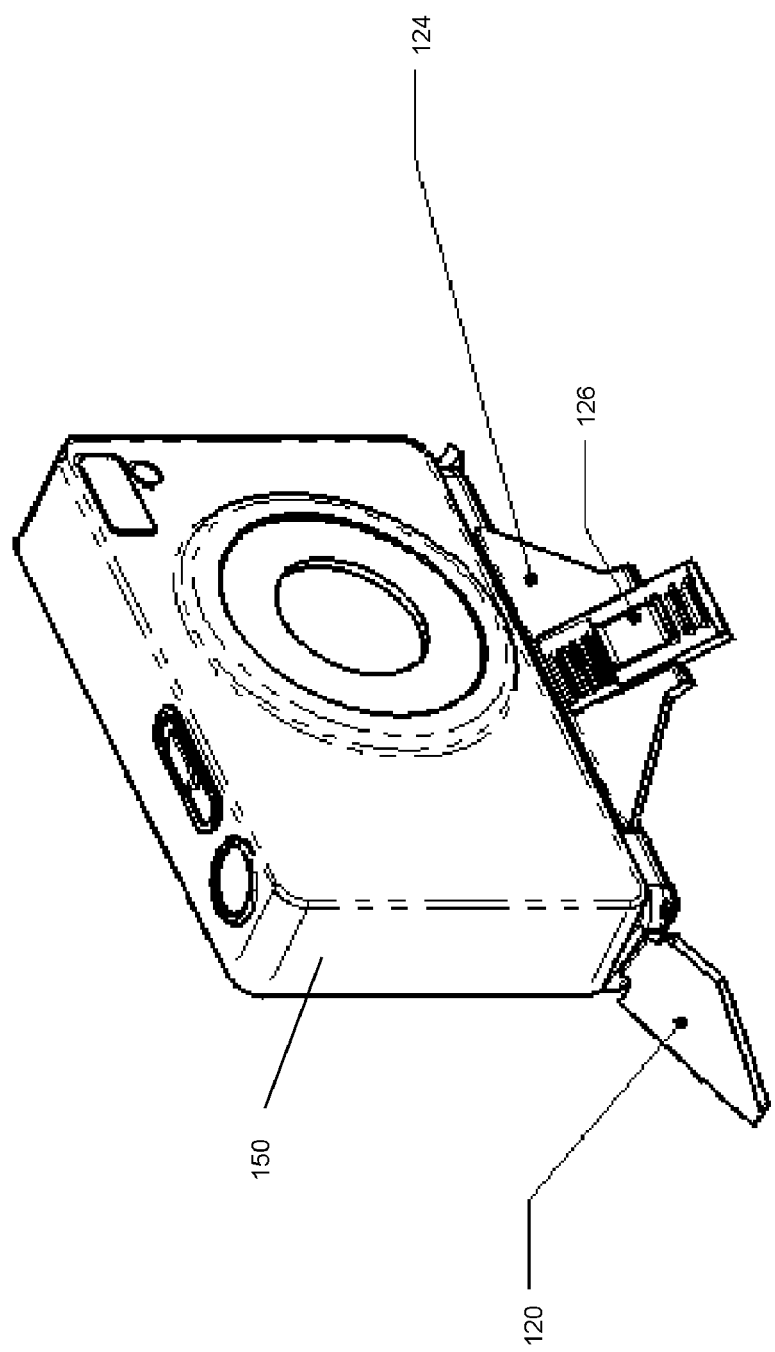
FIG. 4 shows an example of the pitch adjustment.
Figure 5:
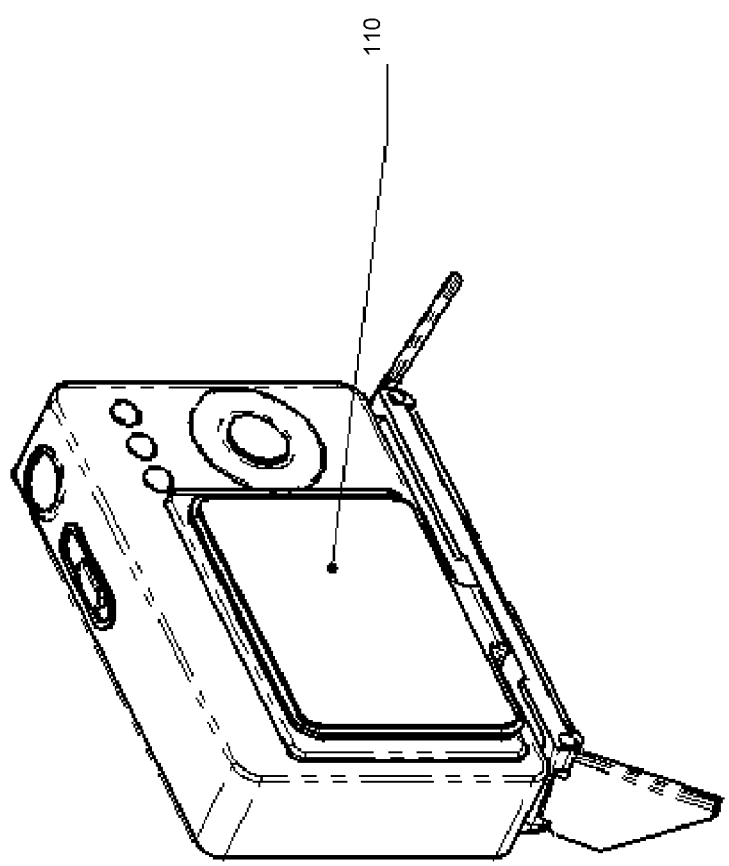
FIG. 5 shows an LCD/display protection.

The rest of the disclosure describes more embodiments and examples: FIGS. 1-22 describe different features and examples of the current invention. FIGS. 2-8 show an embodiment of a micro-tripod 100 with an adjustable LCD shield 110. LCD Shield 110 is optional. Micro-tripod 100 includes side legs 120, 122 and a front leg 124. Front leg 124 includes a pitch adjustment mechanism 126 which can be extended or retracted to adjust the pitch of a camera 150 mounted on micro-tripod 100, as shown in FIG. 4. Micro-tripod includes a base 130 including a slot 132. Side legs 120, 122 are coupled to base 130 using angled hinges 128, as shown in FIGS. 3A and 3B. An angle 127 of angled hinges allows side legs 120, 122 when opened to be further back of base 130, as shown by the distance 129 in FIG. 3B. Further, as shown in FIG. 3A, legs 120, 122, and 124 may have angled edges 125 such that they next against base 130 without overlapping, as shown in FIG. 3A. FIG. 3A shows micro-tripod 100 with legs 120, 122, 124 in the stored or folded position and FIG. 3B shows legs 120, 122, 124 in the open position.

FIG. 6A shows the LCD shield 110 including a hinge 116 that permits LCD shield 110 to be rotated away from the LCD screen in a direction substantially parallel front or back surface of the camera 150, as indicated by arrow 114. FIG. 6B shows LCD shield 110 including a hinge 118 that permits LCD shield 110 to pivot away from the back surface of camera 150, as indicated by arrow 119. The LCD shield 110 can be used as a support, for camera to lean on, for a better stability. The LCD shield 110 is usually over-sized, as shown in FIG. 6B, compared to most LCDs, and it can pivot or slide away, for the user to access the buttons or controls 152 on the camera 150.

Figure 7:
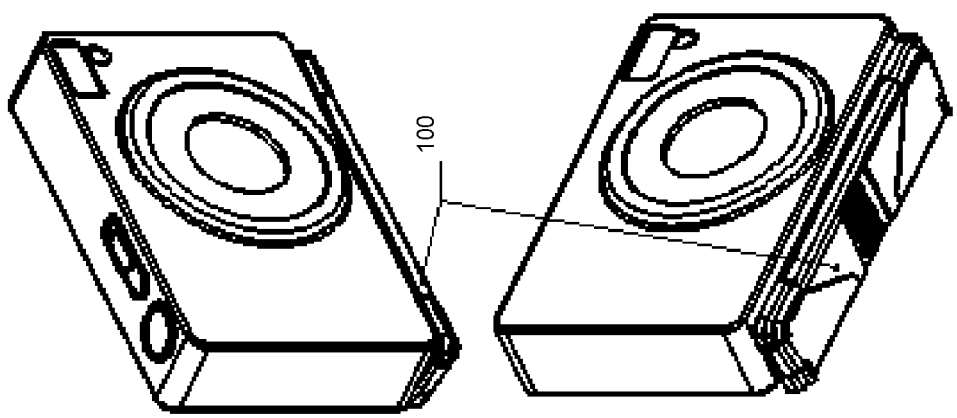
FIG. 7 shows the folded legs.
Figure 8:
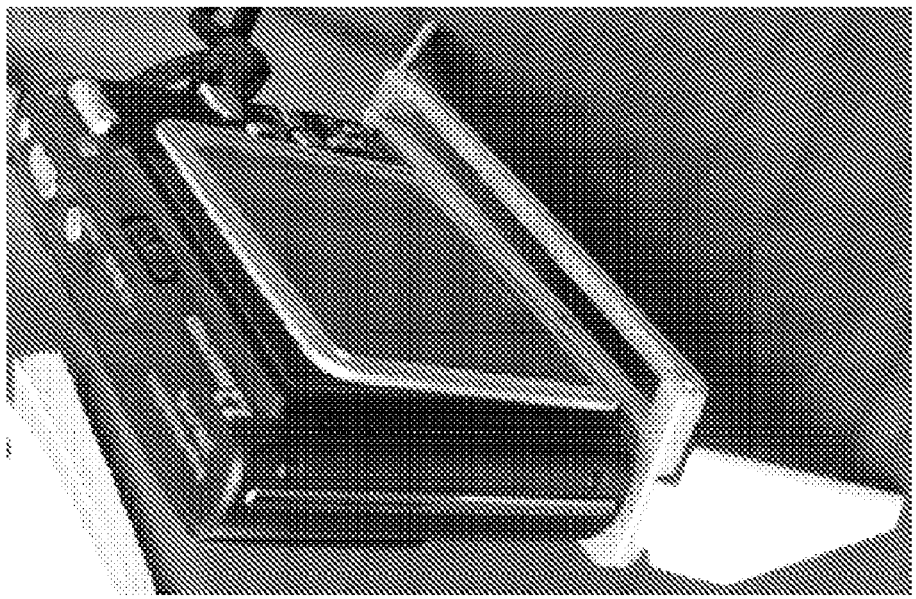
FIG. 8 shows an LCD/display protection.

FIG. 7 shows the micro-tripod 100 with folded legs 120, 122, 124, underneath, attached to the camera such that micro-tripod 100 lives with the camera even when micro-tripod 110 is not in use.

Figure 9:
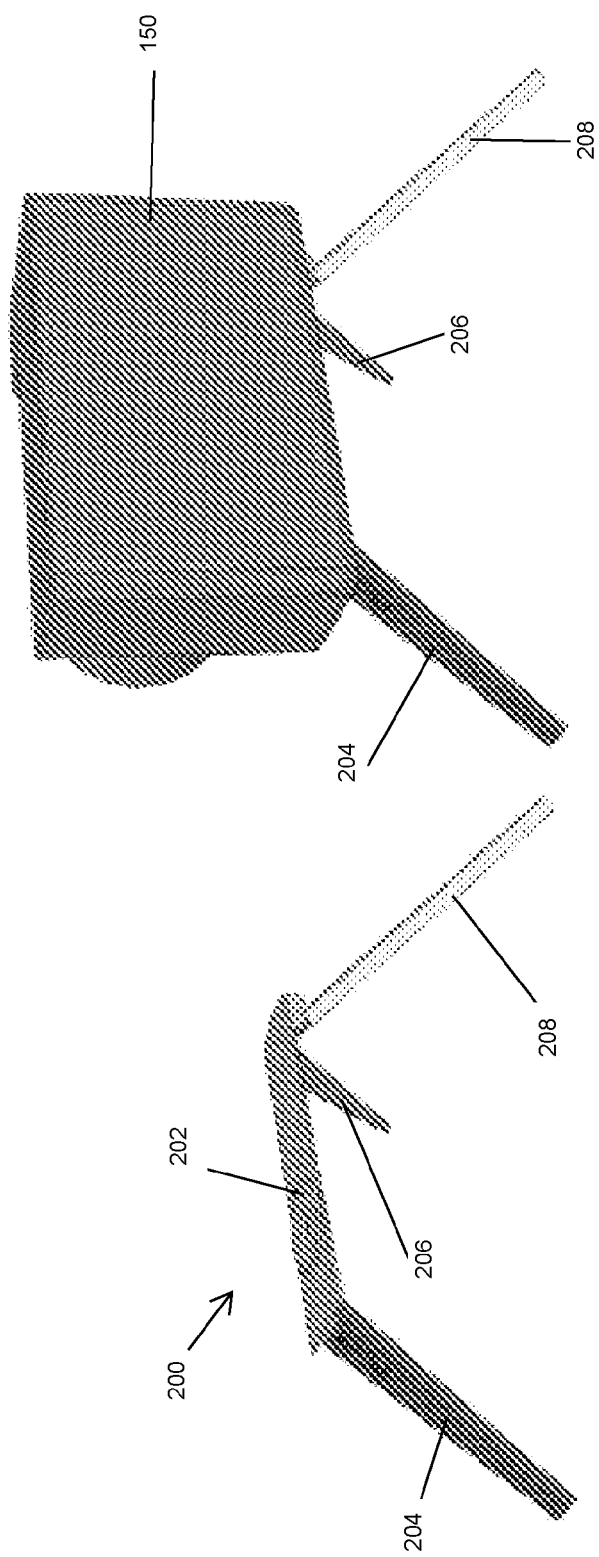
FIG. 9 shows the legs.
Figure 10:
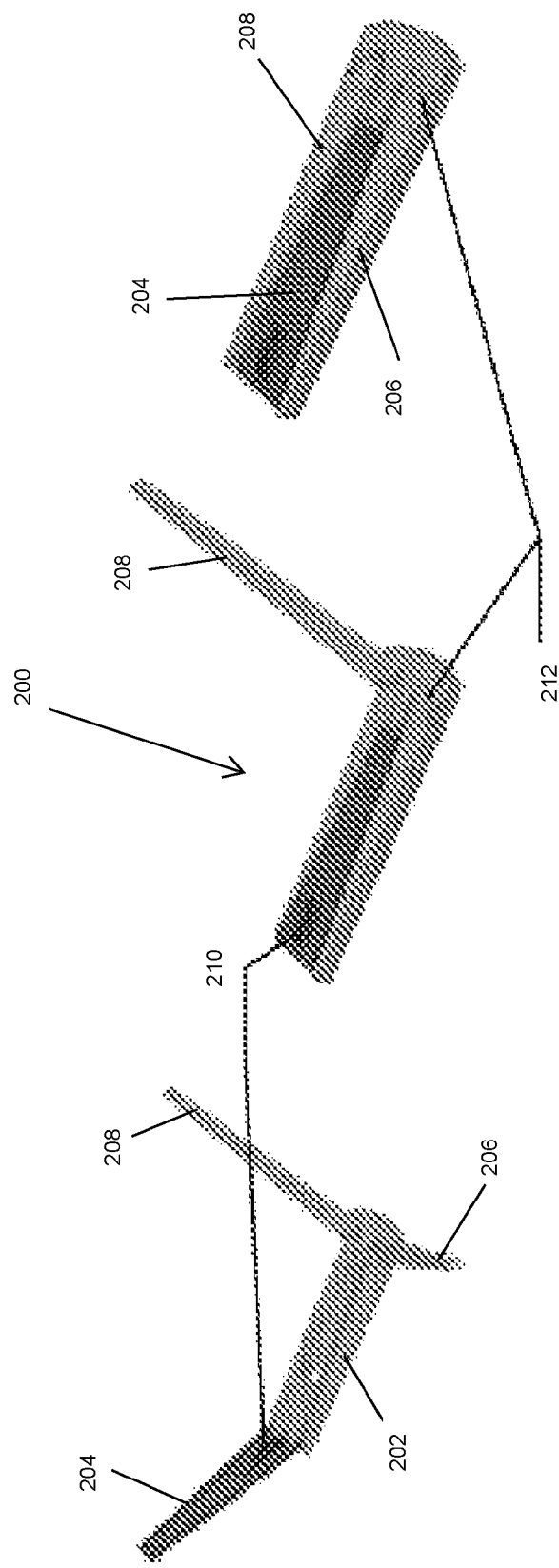
FIG. 10 shows the angle adjustment.

FIG. 9 shows another embodiment of a tripod 200 including a base 202, a first leg 204 disposed at one side of base 202, and second and third legs 206, 208 disposed at an opposite side of base 202. FIG. 10 shows an angle adjust (threaded stop) 210 that permits changes to the angle of open leg 204. FIG. 10 also shows angle hinge points 212 to spread legs 206, 208 and shows legs 204, 206, 208 folded or nested against base 202.

Figure 14:
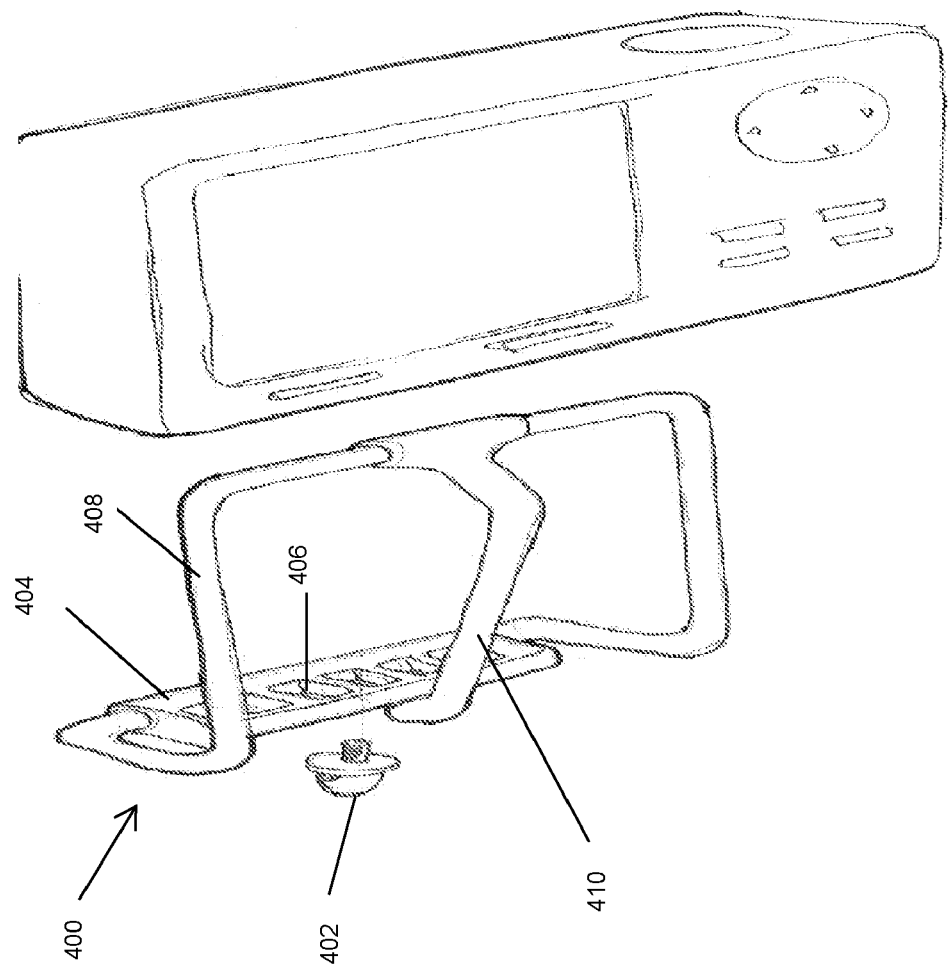
FIG. 14 shows the support setup.
Figure 15A:
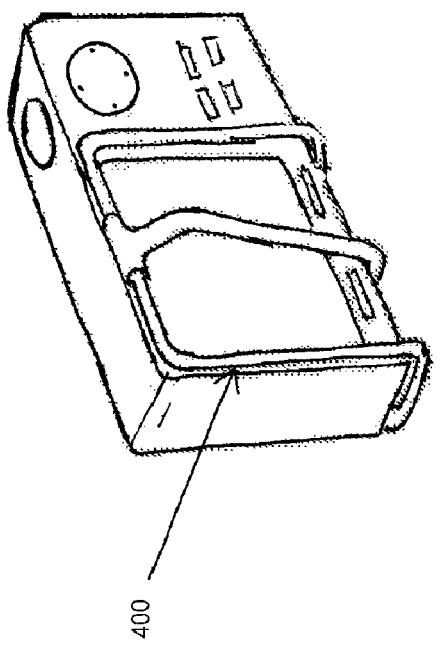
FIG. 15 shows the support setup.
Figure 15B:
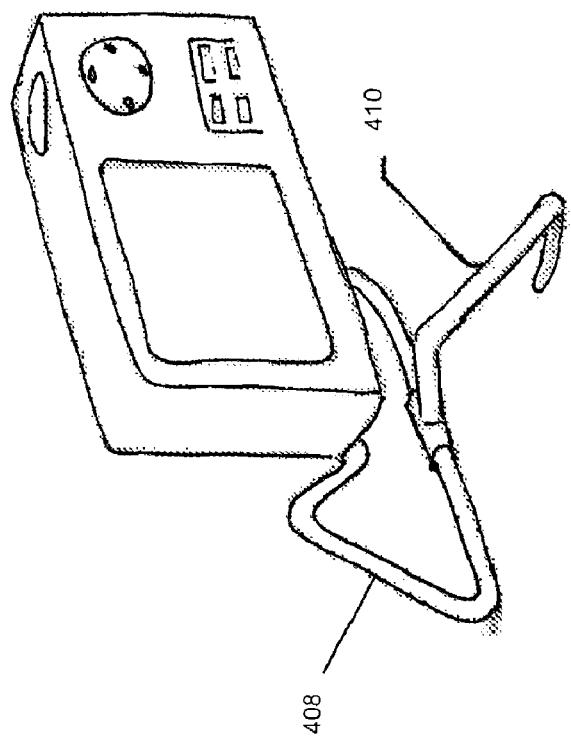

FIGS. 14 and 15 show another embodiment of a standing assembly 400 that can be used to support the camera and to protect the LCD. As shown in FIG. 14, the standing assembly 400 includes a base 404 with holes 402 disposed therethrough. A thumb screw 402 is used to attach base 404 to a camera, for example, in the tripod mounting hole of a camera. Stand 400 further includes a first leg 406 rotatably coupled to base 402 and a second leg 408 rotatably coupled to first leg 406. In a first position shown in FIG. 15A, first leg 406 and second leg 408 are position to protect the LCD screen. FIG. 15B shows first leg 406 rotated away from the LCD screen, under the camera and to a position in front of the camera, and second leg 408 rotated relative to first leg 406 such that second leg 406 extends towards the back of the camera, such that standing assembly 400 supports the camera.

Figure 16:
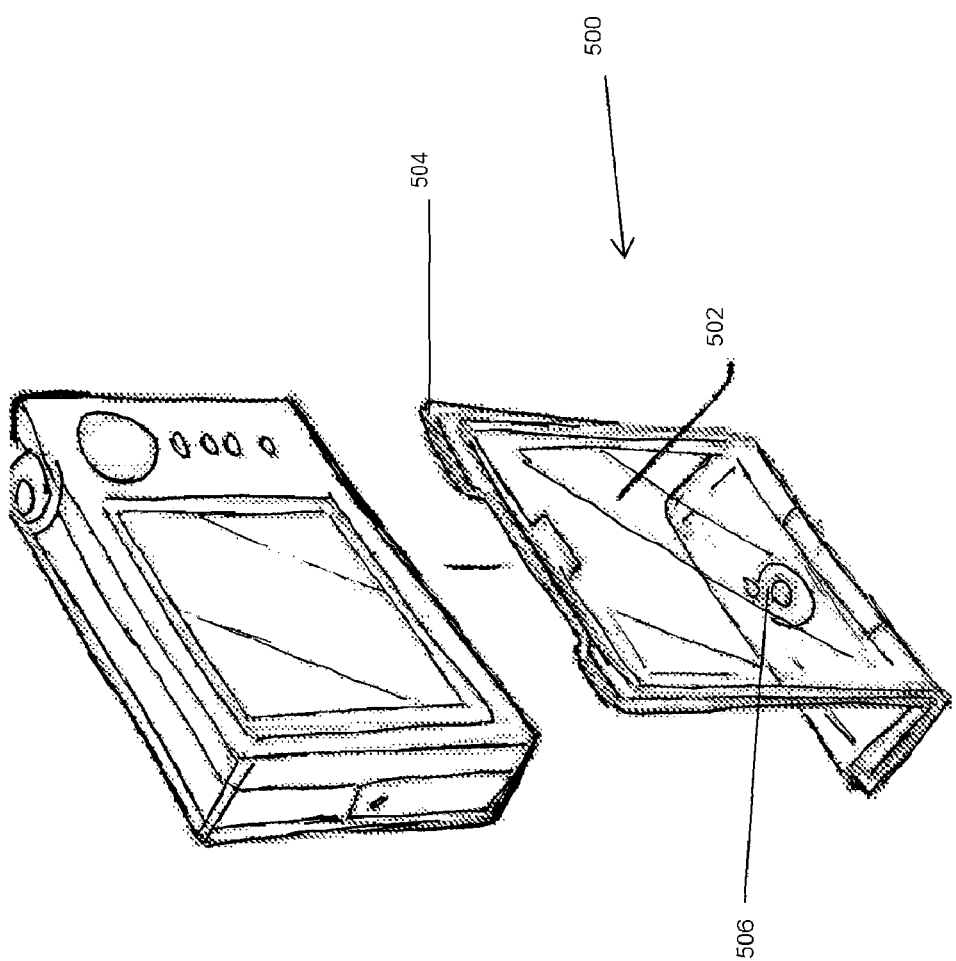
FIG. 16 shows the display support setup.
Figure 17:
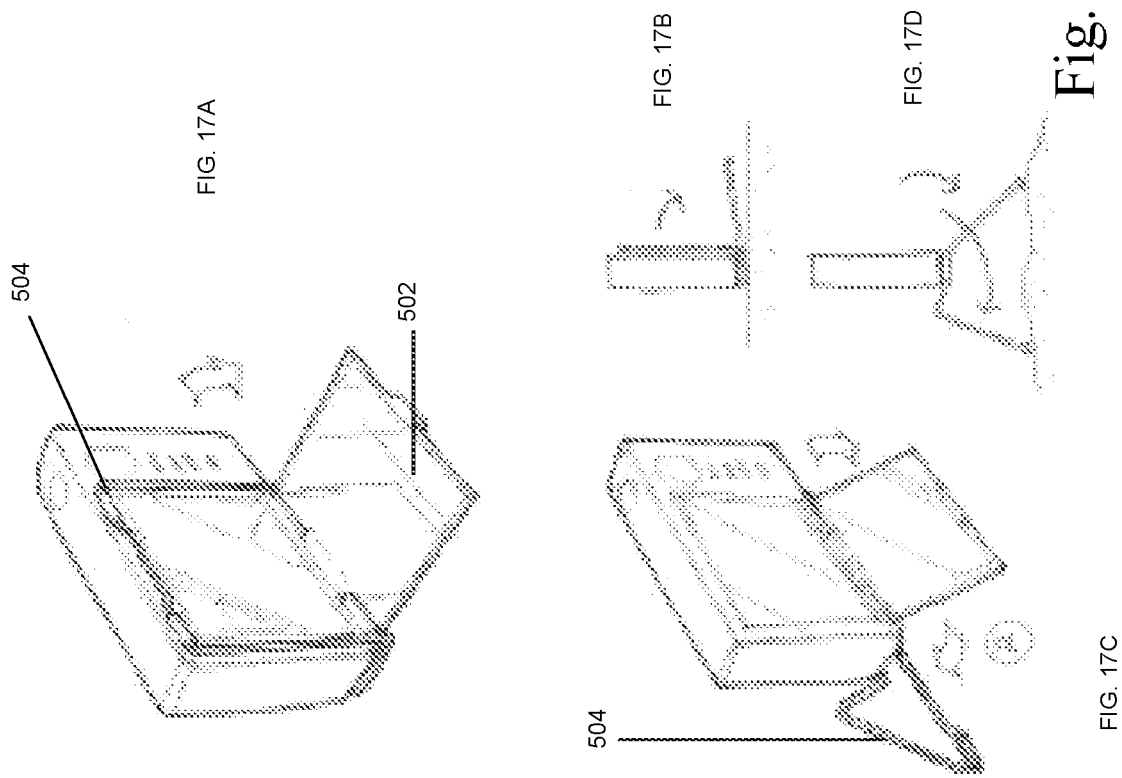
FIG. 17 shows the display support setup.

FIGS. 16 and 17 show another embodiment of a standing assembly 500 including a clear polycarbonate screen protection 502 and a roll bar 504. Standing assembly 500 is attached to the camera using a thumb screw 506. FIGS. 17A and 17B show the clear screen cover 502 pivoting down, with roll bar 504 still in place around the LCD screen. FIGS. 17C and 17D show fold roll bar 504 rotated in front of the camera and cover 502 further rotated such that cover 502 and roll bar 504 are used in conjunction for tripod action to support the camera.

Figure 18:
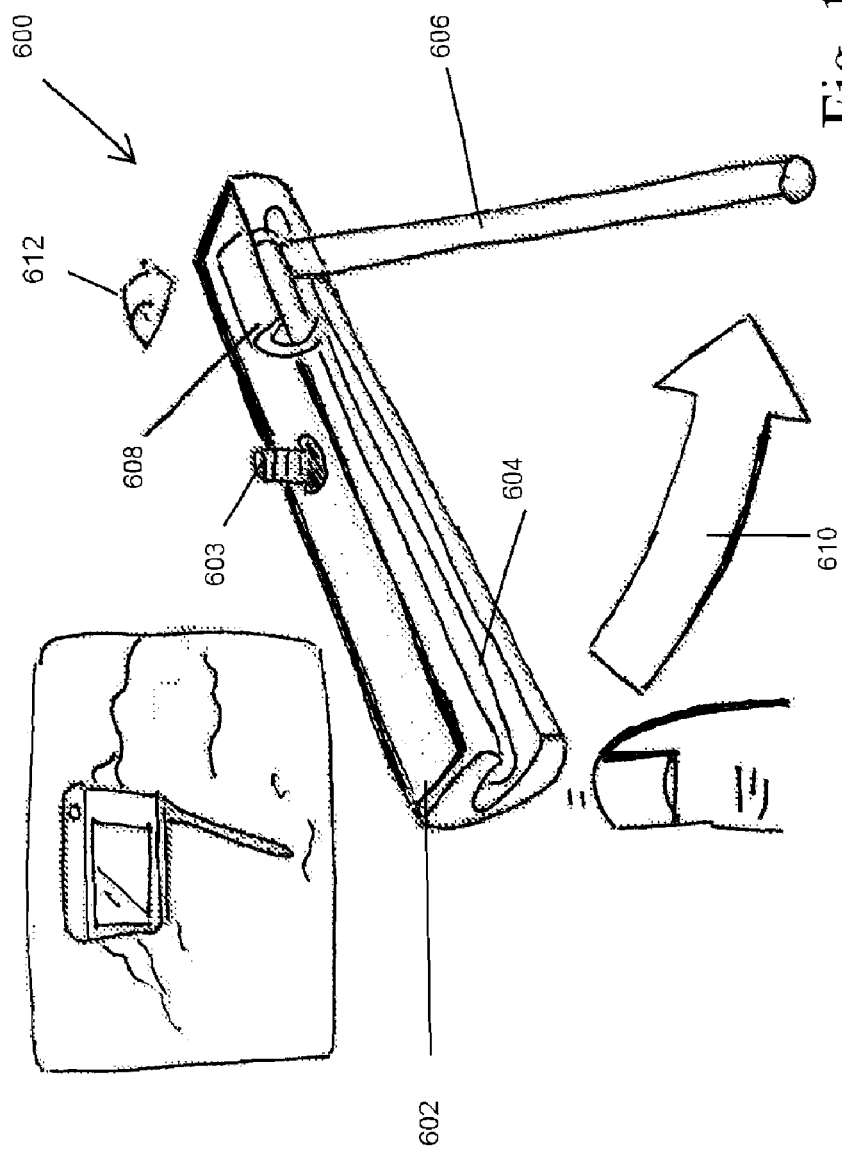
FIG. 18 shows the kickstand concept.
Figure 19:
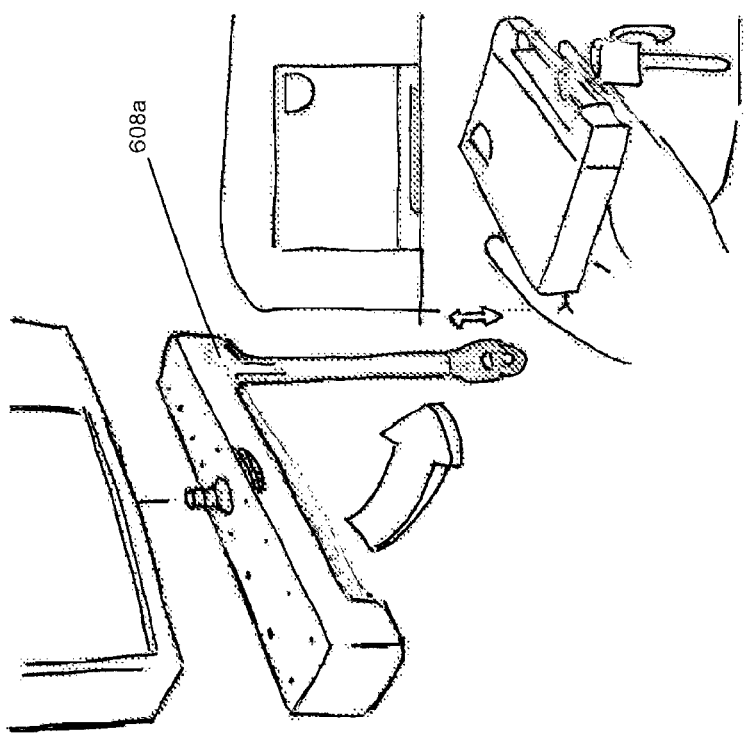
FIG. 19 shows the ball and socket tilt rod.

FIG. 18 shows another embodiment of a standing assembly 600, wherein a small metal rod 606 pivots out of a slot 604 in a main body 602, as shown by arrow 610. Main body 602 may also include an attachment device 603 to attach main body 602 to the camera. FIG. 18 also shows the secondary tilt feature indicated by hinge 608 and arrow 612. FIG. 19 shows a variation wherein ball and socket type connection 608a couples the small metal rod to the main body to provide a large range of motion for the rod relative to the main body. FIG. 19 also shows a keychain feature.

Figure 20:
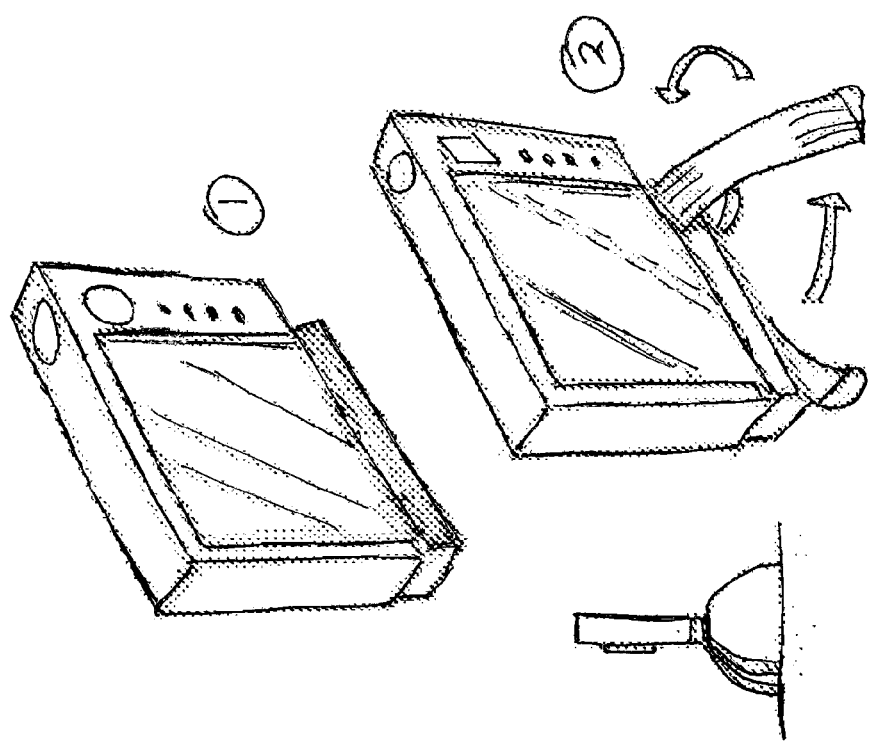
FIG. 20 shows another example for the legs.
Figure 21:
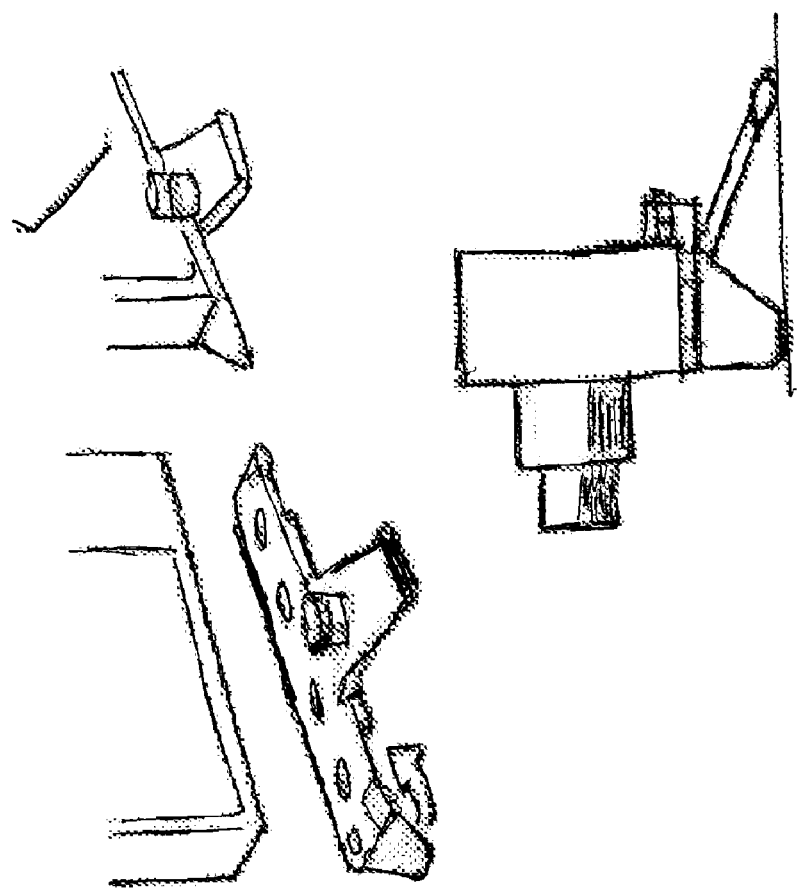
FIG. 21 shows the short leg design.

FIG. 20 shows different leg setup. FIG. 21 shows a rotating thumbwheel to adjust the tilt. Also, FIG. 21 shows the rotate-down for adjustable kickstand.

FIGS. 22A to 22D show an embodiment of a rotating bar standing assembly 700. Stand 700 includes a base plate 702 and a rotating plate 704. As shown in FIGS. 22A and 22B, when plates 702, 704 are aligned and plate 702 is attached to the camera 150, the plates can be stored underneath the camera. Plate 704 can be rotated in the direction of arrow 712 such that plates 702, 704 are disposed substantially perpendicular to each other, as shown in FIGS. 22C and 22D. Plates 702, 704 may be packaged together, e.g. by spring action. FIG. 22D also shows that a gap 706 appears between plate 702 and plate 704 as the plate 704 is rotated 90 degrees, allowing the camera to tilt in the direction of arrows 710 around element 708. (Note that the camera can be positioned for both the portrait and the landscape view pictures.)

Different LCD or display covers or shields (an optional feature) can be used (or also used for any other parts of the tripod), such as anything that is made of or comprised of one or more of the following materials or structures: plastic, elastic material, nylon, bubble-protection material, layered material, soft material, synthetic material, shock absorbent material, hard material, solid material, liquid-containing material, gas-containing material, pressurized-gas-containing material, balloon-type material, inflatable material, gel-type material, natural material, leather, water-proof material, oil-protected surface, paper, cardboard, stretchable material, elastic band, net-shape material, mesh, hollow material, cushion material, solid object, magnetic material, metallic material, metallic sheet, metallic chain, array of metallic rings, 2-dimensional structure, multi-dimensional structure, flat structure, non-smooth plate, smooth plate, folded structure, hinged objects, hinged plates, hinged micro-plates, connected tiles, Lego-shaped material, brick-shaped material, ceramic tiles, stone tiles, artificial material tiles, glass tiles, transparent material, translucent material, clear material, reflective material, containing mirror, fluorescent material, metal-plated material, painted material, rug, woven material, bamboo, carpet material, wooden material, sticks, insulation material, water-cooling jacket, air-cooling jacket, heating-element jacket, insulation jacket, or any compound, chemical, or composite material.

The tripod can be connected to, or attached to, one or more of the following items: a picture frame, clock, notebook, calculator, solar cell array, battery, pen holder, pen, pencil, magnetic plate, magnetic decoration, magnetic pieces, Velcro, hook-and-loop, dual lock, fastener, rubber band, light, LED, LCD, display, TV, radio, thermometer, pressure gauge, biometric sensor, thumb or fingerprint recognition module, combination lock, lock, password entry input, keyboard, input device, pointing device, speaker, microphone, telephone set, keychain ring, hook, video game, music player, downloading unit, wireless unit, communication unit, antenna, small computer, small web browser, voice, video, or picture recorder, or any electronic or mechanical device, apparatus, system, toy, decoration, or equipment.

The attachment device or connection device used on the tripod (if any), is (or uses) one or more of the following devices, methods, or items (or can be used for the adjustment mechanism on the tripod): chain, hook, Velcro, hook-and-loop, belt, adjustable belt, cable, string, tether, tie, binding means, magnet, screw, nut, nail, glue, temporary glue, knot, friction-based connector, connection means, elastic band, two extremely smooth surfaces, by electrostatic force or means, or by electromagnetic force or means.

In one embodiment, the tripod is made of pivoting legs, hinged legs, flexible legs, rigid legs, goose-neck legs, segmented legs, snake-shaped flexible legs, telescopic legs (sliding mechanism or screwing-in mechanism) (with cylindrical shape, square shape, or plate shape/cross section), foldable legs (with one or multiple folds or hinges per leg), hydraulic legs, mechanically-raising-legs, inflatable legs, balloon-type legs, tube-type legs, lifting legs with a mechanism similar to helicopter (lifting and staying/stabilizing at a position in space/in mid-air, using the motors or engines attached to the assembly), legs made of series of small beads (with a string, rubber, or elastic rope going through the hollow beads) (to hold a solid shape for the whole leg, once the string or rubber is pulled), flat legs, cylindrical legs, legs with the suction cups at the end/bottom of the legs (to attach to/grab a smooth surface), curved legs, S-shaped legs, T-shaped legs, plate-shaped legs, sliding-plate-shaped legs, or any conventional legs or supports.

In one embodiment, the 90-degree swivel of one of the legs allows the support of a much bigger lens (and more stability). The legs can be 4 or more, defining only one plane on the surface (for the stability on a plain flat surface), or defining more than one planes for different set of legs (for stability on steps or ladders, for stability on an inclined or sloped surface (such as a roof or sloped street), or for stability on a curved surface). Note that 3 points in space define a unique geometrical flat surface.

In one embodiment, the legs can be in pairs (or multiple legs in a branch), or comprising small legs (or flexible small legs, for hugging an uneven surface, for a better stability). For better stability, the legs are connected horizontally by a chain, rod, or string, in a mid-section. The legs can be adjusted independently. (Note that adjustable screw determines how far the tilt can go.)

In one embodiment, the tripod can be attached to the camera permanently, or attached temporarily, by the user's choice. The adjustment assembly and the attachments (normally under the camera) can be positioned in the other sides of the camera, as well. In addition, in general, they do not have to be symmetrical, with respect to the camera. In one embodiment, the camera and its assembly can be rotating by a motor or by the user.

Any other variation of the teachings above is intended to be protected by the current patent.

The invention claimed is:

1. A tripod or a standing assembly to support or hold a camera or an object, comprising:
    at least 3 legs, each leg generally defining a planar surface and having a proximal end and a distal end, the legs having a deployed configuration and a folded configuration,
    wherein in the deployed configuration, said legs are generally splayed,
    wherein the proximal ends of at least two of said legs are not originated at the same point, termination, connection, or hinge, and wherein said proximal ends are disposed adjacent a first surface of the camera or object to which the tripod or standing assembly is coupled,
    wherein when in the folded configuration, said legs fold such that the planar surfaces of said legs lie on a single plane parallel to a planar surface of the first surface of the camera or object.

2. A tripod or a standing assembly as recited in claim 1, wherein the camera or object is an optical device, laser device, land survey device, or construction device.

3. A tripod or a standing assembly as recited in claim 1, further comprising a pivoting part or leg configured to support a large or heavy camera or object.

4. A tripod or a standing assembly as recited in claim 1, wherein the object is selected from one or more of the following items: a picture frame, clock, notebook, calculator, solar cell array, battery, pen holder, pen, pencil, magnetic plate, magnetic decoration, magnetic pieces, Velcro, hook-and-loop, dual lock, fastener, rubber band, light, LED, LCD, display, TV, radio, thermometer, pressure gauge, biometric sensor, thumb or fingerprint recognition module, combination lock, lock, password entry input, keyboard, input device, pointing device, speaker, microphone, telephone set, keychain ring, hook, video game, music player, downloading unit, wireless unit, communication unit, antenna, small computer, small web browser, voice, video, or picture recorder, or any electronic or mechanical device, apparatus, system, toy, decoration, or equipment.

5. A tripod or a standing assembly as recited in claim 1, wherein said legs comprise one or more of the following: pivoting legs, hinged legs, flexible legs, rigid legs, gooseneck legs, segmented legs, snake-shaped flexible legs, telescopic legs, foldable legs with one or multiple folds or hinges per leg, hydraulic legs, mechanically-raising-legs, inflatable legs, balloon-type legs, tube-type legs, legs made of series of small beads, flat legs, cylindrical legs, legs with the suction cups at the end or bottom of the legs, curved legs, S-shaped legs, T-shaped legs, plate-shaped legs, sliding-plate-shaped legs, pairs of legs, multiple small legs, flexible small legs, horizontally-connected legs, independently-adjusted legs, or any conventional legs or supports.

6. A tripod or a standing assembly as recited in claim 1, wherein said tripod standing assembly is permanently connected or attached to the camera or object.

7. A tripod or a standing assembly as recited in claim 1, wherein the camera or object is rotatable on said tripod or standing assembly.

8. A tripod or a standing assembly as recited in claim 1, further comprising a base coupled to the proximal end of said legs, wherein the base comprises a planar surface coupled to the first side of the camera or object, and wherein in the folded configuration, the planar surfaces of the legs fold against the base.

9. A tripod or standing assembly as recited in claim 1, wherein the distal ends of said legs in the deployed configuration define a planar polygon on a flat floor or on a resting or supporting flat surface.

10. A tripod or standing assembly as recited in claim 1, wherein said at least three legs comprise at least four legs and wherein the distal ends of said legs in the deployed configuration define a non-planar polygon with vertices located on a stepped, sloped, curved, or inclined surface.

11. A tripod or a standing assembly as recited in claim 1, wherein the camera or object is a compact point-and-shoot camera, camera phone, or SLR camera.

12. A tripod or a standing assembly as recited in claim 11, wherein the tripod or standing assembly adjusts for pitch, roll, and yaw of the compact point-and-shoot camera, camera phone, or SLR camera.

13. A tripod or a standing assembly as recited in claim 12, wherein at
    least one of said legs is adjustable for length or angle relative to the first surface of the camera or object to adjust the pitch, roll, and yaw.

14. A tripod or a standing assembly as recited in claim 11, further comprising a hinge mechanism to allow the compact point-and-shoot camera, camera phone, or SLR camera to be positioned for portrait mode and landscape mode.

15. A tripod or a standing assembly as recited in claim 1, further comprising a display shield or cover configured to cover a display of the camera or object.

16. A tripod or a standing assembly as recited in claim 15, wherein said display is an LCD or OLED.

17. A tripod or a standing assembly as recited in claim 15, wherein said display shield or cover is configured to be pivoted or slid away from the display so that buttons or controls on the camera or object become accessible.

18. A tripod or a standing assembly as recited in claim 15, wherein
    said display shield or cover, or other parts of said tripod or standing assembly, is made of or comprised of one or more of the following materials or structures: plastic, elastic material, nylon, bubble-protection material, layered material, soft material, synthetic material, shock absorbent material, hard material, solid material, liquid-containing material, gas-containing material, pressurized-gas-containing material, balloon-type material, inflatable material, gel-type material, natural material, leather, water-proof material, oil-protected surface, paper, cardboard, stretchable material, elastic band, net-shape material, mesh, hollow material, cushion material, solid object, magnetic material, metallic material, metallic sheet, metallic chain, array of metallic rings, 2-dimensional structure, multi-dimensional structure, flat structure, non-smooth plate, smooth plate, folded structure, hinged objects, hinged plates, hinged microplates, connected tiles, Lego-shaped material, brick-shaped material, ceramic tiles, stone tiles, artificial material tiles, glass tiles, transparent material, translucent material, clear material, reflective material, containing mirror, fluorescent material, metal-plated material, painted material, rug, woven material, bamboo, carpet material, wooden material, sticks, insulation material, water-cooling jacket, air-cooling jacket, heating-element jacket, insulation jacket, or any compound, chemical, or composite material.

* * * * *